(12) United States Patent
Kihara et al.

(10) Patent No.: US 8,454,100 B2
(45) Date of Patent: Jun. 4, 2013

(54) VEHICLE WHEEL DISK

(75) Inventors: Yuji Kihara, Ayase (JP); Yoshinobu Sakashita, Ayase (JP)

(73) Assignee: Topy Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 13/088,903

(22) Filed: Apr. 18, 2011

(65) Prior Publication Data
US 2011/0193405 A1 Aug. 11, 2011

Related U.S. Application Data

(63) Continuation of application No. PCT/JP2009/068975, filed on Nov. 6, 2009.

(30) Foreign Application Priority Data

Nov. 7, 2008 (JP) ................... 2008-286127
Nov. 6, 2009 (JP) ................... 2009-254765

(51) Int. Cl.
*B60B 3/04* (2006.01)
(52) U.S. Cl.
USPC ............. 301/64.101; 301/63.101; 301/63.103
(58) Field of Classification Search
USPC 301/63.101, 63.103–63.104, 63.106–63.108, 301/64.101, 64.704
See application file for complete search history.

(56) References Cited

U.S. PATENT DOCUMENTS

| | | | |
|---|---|---|---|
| 4,610,482 A | 9/1986 | Overbeck | |
| 2003/0080605 A1 | 5/2003 | Coleman | |
| 2003/0080606 A1 | 5/2003 | Coleman | |
| 2003/0080607 A1 | 5/2003 | Coleman | |
| 2003/0080608 A1 | 5/2003 | Coleman | |
| 2004/0227392 A1 | 11/2004 | Coleman et al. | |
| 2005/0006945 A1* | 1/2005 | Alff et al. ................ | 301/63.108 |
| 2005/0017570 A1 | 1/2005 | Alff | |
| 2005/0017571 A1 | 1/2005 | McCorry | |

(Continued)

FOREIGN PATENT DOCUMENTS

| | | |
|---|---|---|
| JP | 10-264601 | 10/1998 |
| JP | 11-254901 | 9/1999 |

(Continued)

OTHER PUBLICATIONS

International Preliminary Report on Patentability issued in PCT/JP2009/068975 on Jul. 7, 2011.

(Continued)

*Primary Examiner* — Jason Bellinger
(74) *Attorney, Agent, or Firm* — DLA Piper LLP (US)

(57) ABSTRACT

A vehicle wheel disk includes a plurality of spoke portions extending radially outwardly from a hub coupling portion with vent windows between the spokes. Each spoke includes a bottom wall and axially extending side walls, with a radially outer disk portion connecting the radially outer ends of the spokes. A connecting wall connects a pair of spoke side portions on opposite sides of the vent window in the circumferential direction of the wheel. The spoke bottom wall includes an axially extending inclined portion and a radially extending main portion. A spoke strengthening wall extends circumferentially from the axial end of the spoke side wall. The connecting wall includes a vent window surrounding portion, a vent window surrounding curved portion, and a crest wall portion of a radially inwardly protruding protrusion.

5 Claims, 12 Drawing Sheets

U.S. PATENT DOCUMENTS

| | | | |
|---|---|---|---|
| 2006/0197371 A1* | 9/2006 | Coleman et al. | 301/63.101 |
| 2007/0222279 A1* | 9/2007 | Csapo et al. | 301/64.101 |
| 2012/0074764 A1* | 3/2012 | McCorry et al. | 301/64.101 |

FOREIGN PATENT DOCUMENTS

| | | |
|---|---|---|
| JP | 2005-035330 | 2/2005 |
| JP | 2005-507810 | 3/2005 |
| JP | 2005-509552 | 4/2005 |
| JP | 2005-511371 | 4/2005 |
| WO | WO 03/037651 | 5/2003 |
| WO | WO 2007/146260 | 12/2007 |

OTHER PUBLICATIONS

International Search Report issued in PCT/JP2009/068658 on Feb. 2, 2010.
English Language Abstract of JP 2005-509552 Published Apr. 14, 2005.
English Language Translation of JP 2005-509552 Published Apr. 14, 2005.
English Language Abstract of JP 2005-511371 Published Apr. 28, 2005.
English Language Translation of JP 2005-511371 Published Apr. 28, 2005.
English Language Abstract of JP 2005-507810 Published Mar. 24, 2005.
English Language Translation of JP 2005-507810 Published Mar. 24, 2005.
English Language Abstract of JP 2005-035330 Published Feb. 10, 2005.
English Language Translation of JP 2005-035330 Published Feb. 10, 2005.
International Search Report issued in PCT/JP2009/068975 on Feb. 2, 2010.
English Language Abstract of JP 11/254901 published Sep. 21, 1999.
English Language Translation of JP 11/254901 published Sep. 21, 1999.
English Language Abstract of JP 10-264601 published Oct. 6, 1998.
English Language Translation of JP 10-264601 published Oct. 6, 1998.
International Preliminary Report on Patentability issued in PCT/JP2009/068658 on Jun. 16, 2011.

* cited by examiner (PRIOR ART)

VEHICLE WHEEL DISK

This is a continuation of International Application PCT/JP2009/068975, filed Nov. 6, 2009, which in turn is based on Japanese Patent Applications JP 2008-286127, filed Nov. 7, 2008 and JP 2009-254765, filed Nov. 6, 2009. The contents of all three applications mentioned in this paragraph are incorporated herein in their entirety.

FIELD OF THE INVENTION

The present invention relates to a vehicle wheel disk. More particularly, the present invention relates to a vehicle wheel disk fabricated from a plate material.

BACKGROUND OF THE INVENTION

Patent Document 1 discloses a vehicle wheel disk having a radially inwardly extending protrusion or rib at a portion radially inside a vent window. As the radially inwardly extending protrusion, Patent Document 1 discloses the following (a) and (b):
(a) a protrusion shown in FIG. 1 of Document 1
The protrusion extends radially inwardly from a first portion to a second portion. The first portion is a portion offset axially more inwardly than a vent window surrounding curved portion which is located radially inside the vent window and is curved axially inwardly. The second portion is a portion located more radially inward than a wheel radial region where hub bolt holes are provided. In a cross section of the wheel taken along a plane perpendicular to a wheel axis, the protrusion has a pair of side walls and a crest wall which connects ends of the pair of side walls and extends straight.
(b) a protrusion shown in FIG. 4 of Document 1
The protrusion extends radially inwardly from a third portion to a fourth portion. The third portion is a vent window surrounding curved portion which is located radially inside the vent window and is curved axially inwardly. The fourth portion is a portion located more radially inward than a wheel radial region where huh bolt holes are provided. In a cross section of the wheel taken along a plane perpendicular to a wheel axis, the protrusion has a pair of side walls and a crest wall which connects ends of the pair of side walls and has a shape of a convex arc having a single radius.

PRIOR ART DOCUMENT

Patent Document 1: U.S. Patent Publication 2006/0197371

BRIEF SUMMARY

An object of the invention is to provide a rigid and durable vehicle wheel disk which may have a variety of different spoke and hub bolt hole numbers and locations, and which provides easy access to hub nuts.

Embodiments of the present invention may include:

A vehicle wheel disk comprising a hub coupling portion, a plurality of spoke portions each extending outwardly in a radial direction of a wheel from the hub coupling portion and having a spoke bottom wall and a spoke side portion, a vent window located between adjacent spoke portions of the plurality of spoke portions; a disk radially outer portion located at a radially outer end portion of the wheel and connecting radially outer end portions of the plurality of spoke portions in a circumferential direction of the wheel, and a connecting wall located radially inside the disk radially outer portion and connecting a pair of spoke side portions located on opposite sides of the vent window in the circumferential direction of the wheel.

The spoke bottom wall includes a bottom wall inclined portion extending outwardly in an axial direction of the wheel from the hub coupling portion, and a bottom wall main portion extending outwardly in the radial direction of the wheel from the bottom wall inclined portion.

The spoke side portion includes a spoke side wall extending in the axial direction of the wheel from each of opposite circumferential ends of the spoke bottom wall, and a spoke strengthening wall extending in the circumferential direction of the wheel from an axial end of the spoke side wall.

The connecting wall includes a vent window surrounding portion, a vent window surrounding curved portion, and a crest wall portion of a radially inwardly protruding protrusion.

The vent window surrounding portion includes a side portion located on each of opposite sides of the vent window in the circumferential direction of the wheel, and a radially inner portion located radially inside the vent window.

The vent window surrounding curved portion is a portion which is connected to a radially inner end of the radially inner portion of the vent window surrounding portion and is curved axially inboard from the radially inner portion of the vent window surrounding portion.

The crest wall portion of the protrusion is tangentially connected to and at a radially inner end of the vent window surrounding curved portion, connects the vent window surrounding curved portion and the hub coupling portion and protrudes radially more inwardly than the bottom wall inclined portion of the spoke bottom wall.

A configuration of a cross section of the crest wall portion of the protrusion taken along a plane perpendicular to a wheel axis is constructed of a straight line, or an arc or ellipse having a radius of curvature greater than a radius of curvature of the spoke strengthening wall located on each of opposite sides of the crest wall portion of the protrusion.

DETAILED DESCRIPTION OF EMBODIMENTS OF THE PRESENT INVENTION

A vehicle wheel disk according to embodiments of the present invention will be explained below with reference to FIGS. 1-29.

Figure 2:
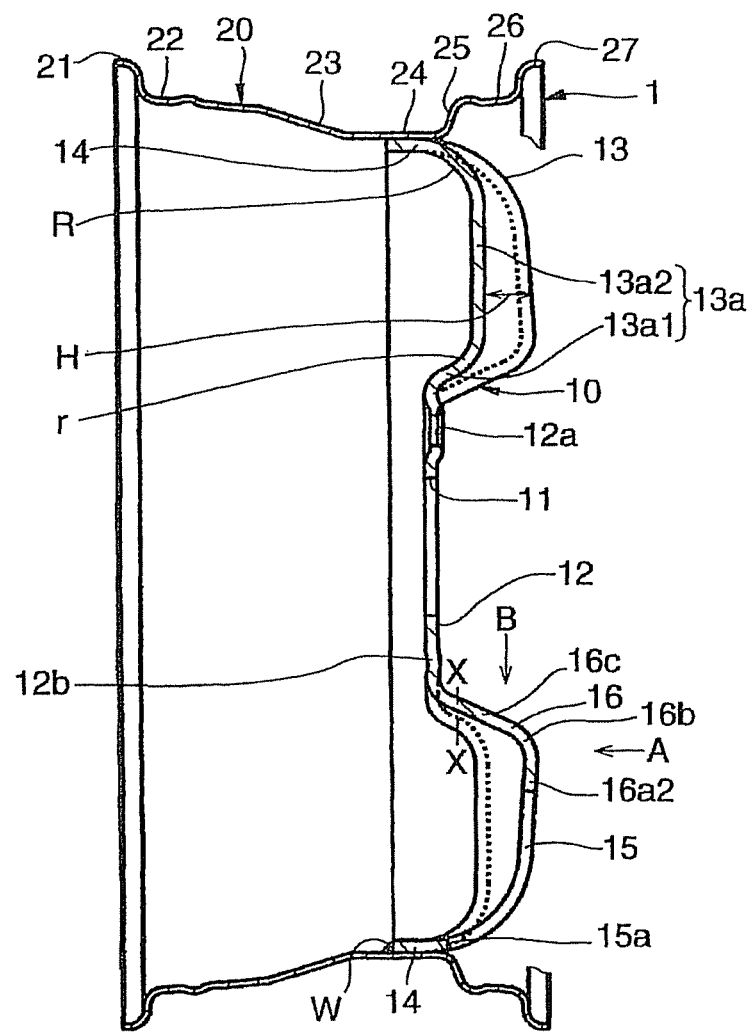
FIG. 2 is a cross-sectional view of a vehicle wheel disk welded with a rim, according to an embodiment of the invention.

A vehicle wheel disk (which may be called a wheel disk or a disk, hereinafter) 10, according to an embodiment of the present invention, is a wheel disk used for a car, a truck, a bus, a vehicle used for business, etc. The wheel disk 10 may include a wheel disk fabricated from a plate (for example, a steel plate) by forming (for example, forming by press) and may not include a cast wheel. As illustrated in FIG. 2, the wheel disk 10 may be welded with an annular rim (a part for holding a tire) 20 to construct a wheel 1.

As illustrated in FIG. 2, the rim 20 may include an inboard flange portion 21, an inboard bead seat portion 22, an inboard side wall portion 23, a drop portion 24, an outer side wall portion 25, an outer bead seat portion 26, and an outboard flange portion 27. The inboard flange portion 21, the inboard bead seat portion 22, and the inboard side wall portion 23 may be located closer to an inside of a vehicle than the outer side wall portion 25, the outer bead seat portion 26 and the outboard flange portion 27 may be disposed in an axial direction of the wheel when the wheel 1 is mounted to the vehicle.

Figure 1:
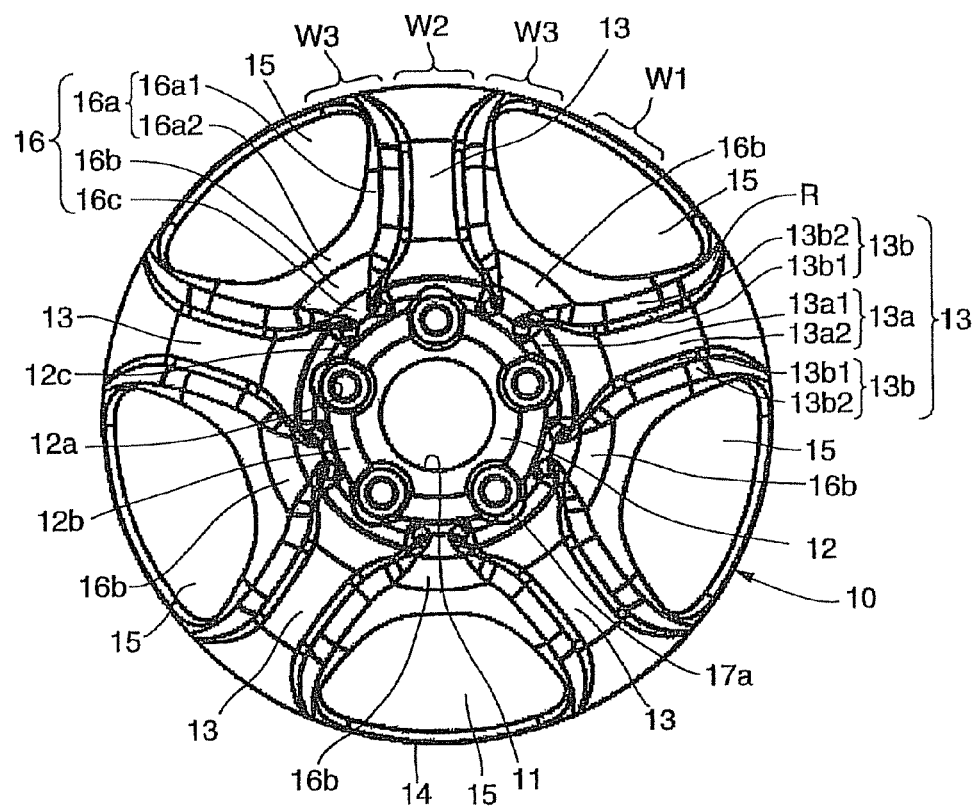
FIG. 1 is a front view of a vehicle wheel disk showing its curved surface by skeleton lines according to an embodiment of the present invention.

As illustrated in FIG. 1, the wheel disk 10 may include a hub hole 11, a hub coupling portion 12, a spoke portion 13 having a spoke bottom wall 13a and spoke side portions 13b, a disk radially outer portion 14, a vent window 15, and a connecting wall 16. The wheel disk 10 does not have an annular, circumferentially continuous and axially protruding protrusion Z located radially outside a hub coupling portion 12, as adopted in the ordinary vehicle wheel disk of FIGS. 24 and 25.

As illustrated in FIG. 1, the hub hole 11 may be located at a radially central portion of the wheel disk 10. The huh coupling portion 12 may surround the hub hole 11. The hub coupling portion 12 may be in the form of a flat plate or a substantially flat plate and may be perpendicular to a wheel axial direction (to an axis of the wheel disk 10). A plurality of hub bolt holes 12a may be provided at a radially intermediate portion of the hub coupling portion 12. The hub bolt holes 12a may be equally spaced along a circumferential direction of the wheel. In one embodiment, five hub bolt holes 12a may be provided. The number of the huh bolt holes 12a may vary in different embodiments of the invention (e.g., three, four, six or more hub bolt holes. By passing hub bolts (not shown) extending from a hub (not shown) through the hub bolt holes 12a and coupling hub nuts (not shown) with the hub bolts, the disk wheel 10 (the wheel 1) may be fixed to the hub.

As illustrated in FIGS. 1 and 2, in order to improve rigidity and durability of the hub coupling portion 12, an arch band 12b and a swell (a sub-rib 17a) may be provided at the hub coupling portion 12. The arch band 12b connects hub bolt holes 12a, is discontinuously annular and convexly swells axially outwardly. The extent of the swell may be small (e.g., about 0.3-5 mm). The swell (a sub-rib 17a) extends between the spoke bottom wall 13a and the hub bolt hole 12a and swells axially outwardly.

As illustrated in FIG. 1, a radially outer portion 12c of the hub coupling portion 12 (a boundary between the hub coupling portion 12 and the spoke bottom wall 13a) may describe a circle broken by the sub-rib 17a, the spoke side portion 13b and the connecting wall 16.

As illustrated in FIG. 2, an axially inner surface of the hub coupling portion 12 may be positioned between an axially outer portion and an axially inner portion of the disk radially outer portion 14 in the axial direction of the wheel.

The spoke portion 13 may extend radially outwardly from the hub coupling portion 12 to the disk radially outer portion 14. A plurality of spoke portions 13 may be provided as illustrated in FIG. 1. The spoke portions 13 may be equally spaced along a circumferential direction of the wheel. In one embodiment, five spoke portions 13 may be provided. The number of the spoke portions 13 may vary in different embodiments of the invention (e.g., three, four or six or more spoke portions).

Figure 26:
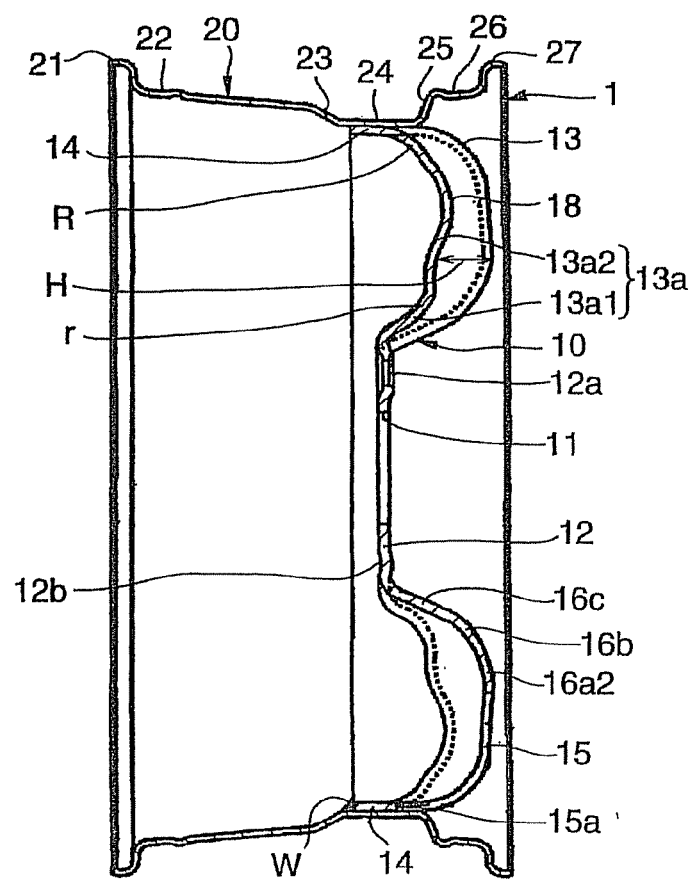
FIG. 26 is a cross-sectional view of a vehicle wheel disk welded with a rim according to an embodiment of the invention.

As shown in FIGS. 2 and 26, a radially outer end portion of the spoke portion 13 may form a radially outer curved connecting portion R which is bent axially inwardly and is connected to the disk radially outer portion 14. A radially inner end portion of the spoke portion 13 may form a radially inner curved connecting portion r which is bent axially inwardly. A radially intermediate portion of the spoke portion 13 (between the radially outer curved connecting portion R and the radially inner curved connecting portion r) may extend in a direction perpendicular or substantially perpendicular to the axial direction of the wheel. Radially opposite ends of the radially intermediate portion of the spoke portion 13 may be located at substantially equal axial positions in the wheel axial direction. The spoke portion 13 may have the spoke bottom wall 13a and the spoke side portions 13b as shown in FIGS. 1, 3, 22 and 23.

Figure 3:
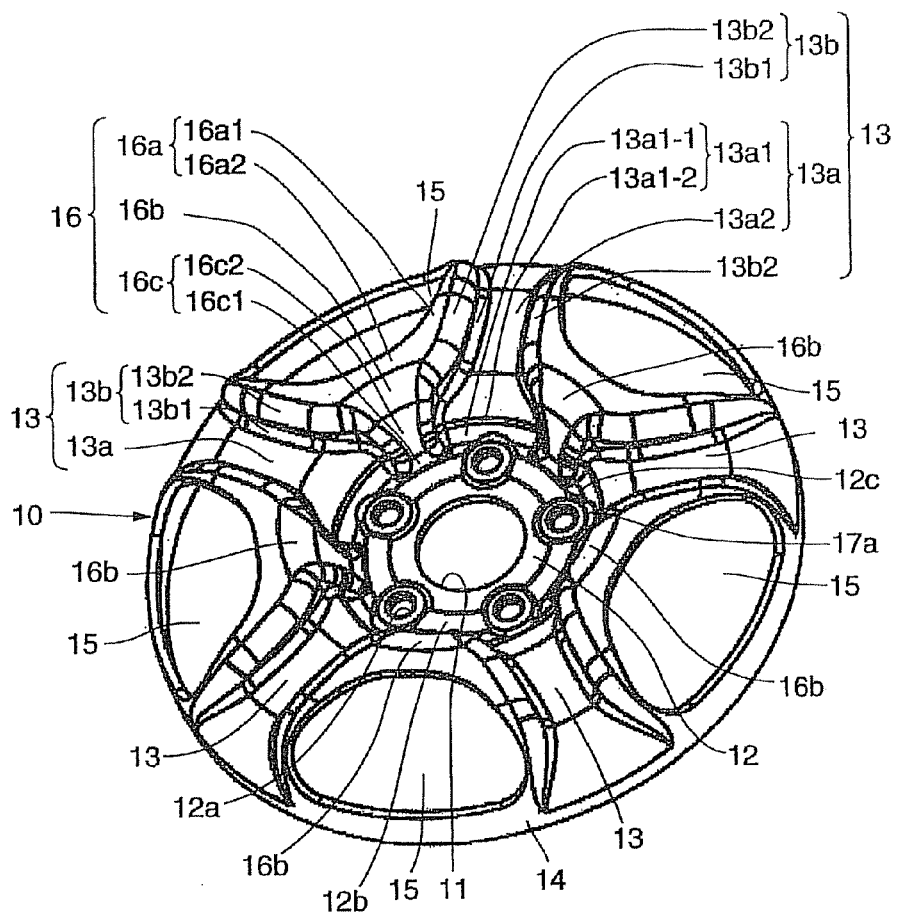
FIG. 3 is an oblique view of a vehicle wheel disk, showing its curved surface by skeleton lines according to an embodiment of the present invention.
Figure 28:
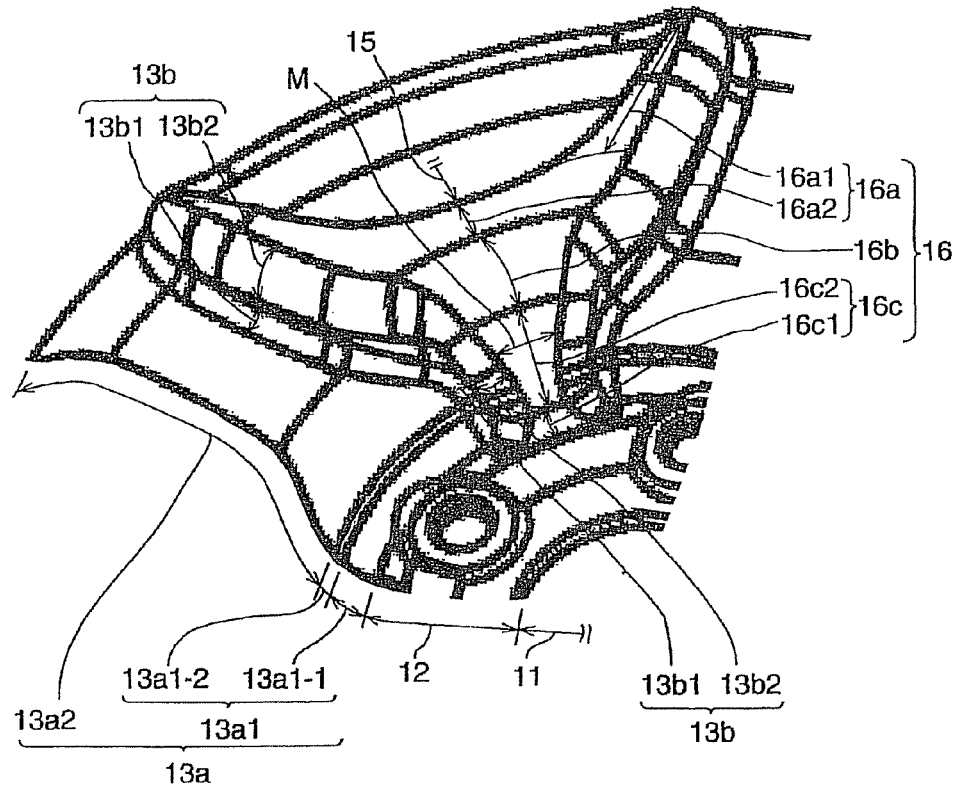
FIG. 28 is an enlarged view of a portion of FIG. 3 showing a connecting wall and its vicinity only, according to an embodiment of the invention.
Figure 29:
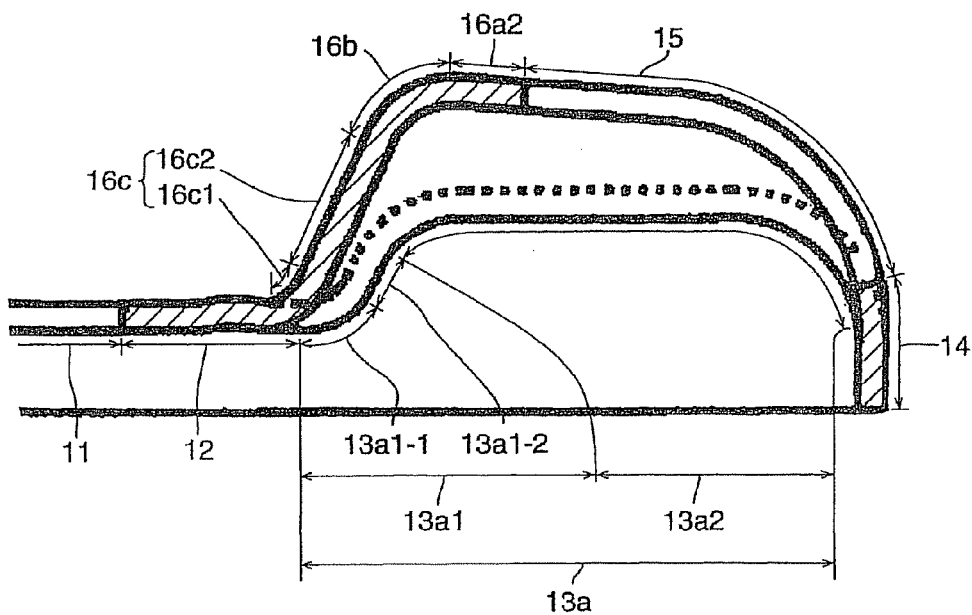
FIG. 29 is an enlarged view of a portion of FIG. 2 showing a connecting wall and its vicinity only, according to an embodiment of the invention.

The spoke bottom wall 13a may extend radially outwardly from the hub coupling portion 12. The spoke bottom wall 13a may also extend in the circumferential direction of the wheel (in a width direction of the spoke portion 13) in a cross section along a plane perpendicular to the radial direction of the wheel. As illustrated in FIGS. 3, 28 and 29, the spoke bottom wall 13a may include a bottom wall inclined portion 13a1 extending axially outwardly from the radially outer portion 12c of the hub coupling portion 12 and a bottom wall main portion 13a2 extending radially outwardly from the bottom wall inclined portion 13a1.

The bottom wall inclined portion 13a1 may include a spoke bottom wall radially inner curved portion 13a1-1 curved axially outwardly from the hub coupling portion 12 and a spoke bottom wall radially inner inclined portion 13a1-2 extending between the spoke bottom wall radially inner curved portion 13a1-1 and the bottom wall main portion 13a2.

In FIG. 2, the bottom wall main portion 13a2 may extend in a direction perpendicular or substantially perpendicular to the axial direction of the wheel. As illustrated in FIG. 26, at the bottom wall main portion 13a2, a waved portion 18 may be provided. The waved portion 18 is a portion where the bottom wall main portion 13a2 is displaced axially more outwardly than a bottom wall main portion having no waved portion. The waved portion 18 decreases a section modulus about an axis perpendicular to a radial direction of each spoke portion 13 perpendicular to an axis of the wheel, at a cross section of the spoke portion 13 along a plane perpendicular to the radial direction of the spoke portion 13. Since the waved portion 18 is provided at the spoke portion 13, a bending rigidity of the portion of the spoke portion 13 where the waved portion 18 is provided is decreased compared with a case where no waved portion is provided.

Figure 22:
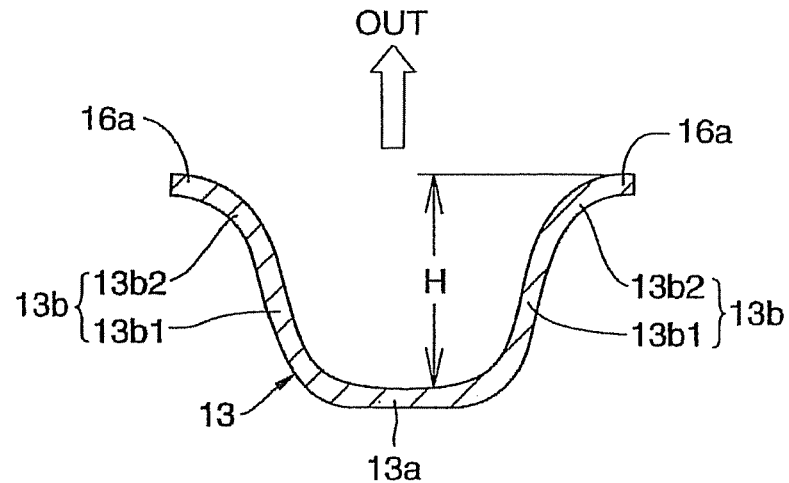
FIG. 22 is a cross-sectional view of a spoke portion of a vehicle wheel disk of an embodiment of the present invention, taken along a plane perpendicular to the radial direction of the wheel.
Figure 23:
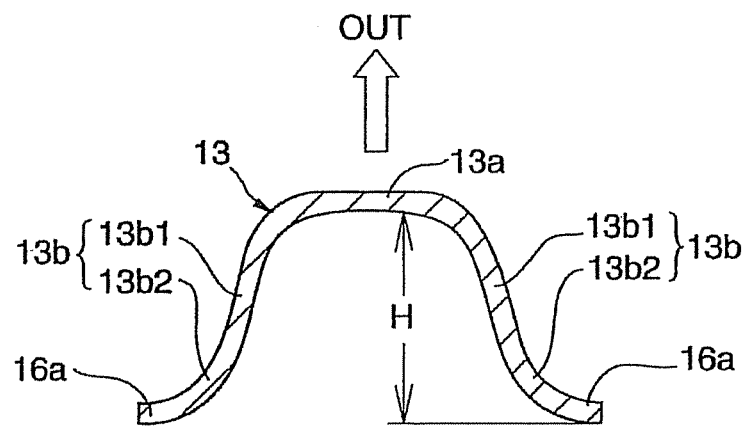
FIG. 23 is a cross-sectional view of a spoke portion of a vehicle wheel disk of an embodiment of the present invention, taken along a plane perpendicular to the radial direction of the wheel.
Figure 24:
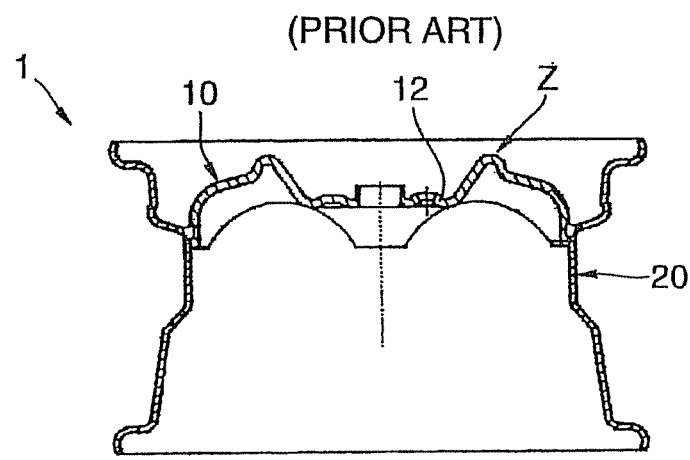
FIG. 24 is a cross-sectional view of an ordinary vehicle wheel disk.
Figure 25:
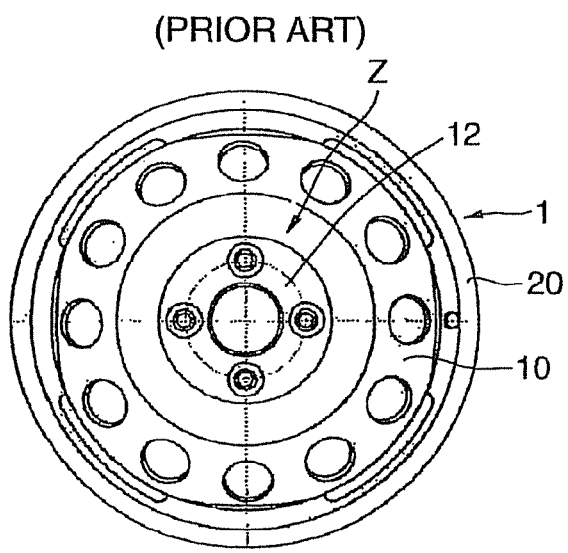
FIG. 25 is a front view of an ordinary vehicle wheel disk.

As illustrated in FIG. 3, the spoke side portion 13b includes a spoke side wall 13b1 and a spoke strengthening wall 13b2. The spoke side wall 13b1 may extend from circumferentially opposite ends of the spoke bottom wall 13a in a direction away from the spoke bottom wall 13a and in the axial direction of the wheel. The spoke side wall 13b1 may extend from the spoke bottom wall 13a axially outwardly as illustrated in FIG. 22 or may extend from the spoke bottom wall 13a axially inwardly as illustrated in FIG. 23. In FIGS. 22 and 23, "OUT" shows the axially outward direction of the wheel.

As illustrated in FIGS. 22 and 23, the spoke strengthening wall 13b2 may extend from an end of the spoke side wall 13b1 opposite the spoke bottom wall in the wheel axial direction and curve from the wheel axial direction to the wheel circumferential direction. The spoke strengthening wall 13b2 may also extend in the wheel circumferential direction so as to enlarge the circumferential width of the spoke portion 13. The spoke strengthening wall 131b2 may be connected to a vent window surrounding portion 16a.

As illustrated in FIGS. 2 and 26, the spoke portion 13 may be located axially more outwardly than the hub coupling portion 12 and the disk radially outer portion 14. As a result, when the wheel 1 is subjected to a load (for example when mounted on a vehicle), a bending moment acts on a spoke portion 13 located on a ground side. In a case where the spoke side wall 13b1 extends axially outwardly from the spoke bottom wall 13a, a tension stress is caused at the spoke strengthening wall 13b2 in the radial direction of the wheel supporting the load. This may ensure rigidity of the disk. In a case where the spoke side wall 13b1 extends axially inwardly from the spoke bottom wall 13a, a compression stress is caused at the spoke strengthening wall 13b2 in the radial direction of the wheel.

An axial width H of the spoke side portion 13b including the vent window surrounding portion 16a may be greatest at a vicinity of a radially inner end of the vent window 15, as illustrated in FIGS. 2 and 26. The maximum of the axial width H of the spoke side portion 13b including the vent window surrounding portion 16a may be two to twenty times the thickness of the spoke bottom wall 13a. In some embodiments of the invention, the maximum of the axial width H of the spoke side portion 13b including the vent window surrounding portion 16a may be four to ten times the thickness of the spoke bottom wall 13a. This may yield a high rigidity of the wheel 1 and a good formability of the wheel disk 10. Though the axial width H of the spoke side portion 13b including the vent window surrounding portion 16a may decrease in a radially outward direction, the axial width H may increase.

As illustrated in FIG. 3, the disk radially outer portion 14 may be located at or near a radially outer end portion of the wheel disk 10. The disk radially outer portion 14 may be formed in the shape of a ring and may connect radially outer end portions of the plurality of the spoke portions 13 in the circumferential direction of the wheel. The disk radially outer portion 14 may be cylindrical and may have a constant or a substantially constant diameter over its entire axial length.

As illustrated in FIG. 2, the disk radially outer portion 14 may be fit to the rim 20 at the drop portion 24 of the rim 20 and may be fixed to the rim 20 by welding or other means. In some embodiments of the invention, the disk radially outer portion 14 may alternatively be fit to the rim 20 at the inboard bead seat portion 22 or the outboard bead seat portion 26.

In some embodiments of the invention, the disk radially outer portion 14 may be fixed to the rim 20 at a position W1 (shown in FIG. 1), where W1 is defined as a circumferential position extending circumferentially along an axially inner end of a portion of the disk radially outer portion 14 located adjacent to the vent window 15.

The disk radially outer portion 14 may alternatively be fixed to the rim 20 at a position W2 (shown in FIG. 1), where W2 is defined as a circumferential position extending circumferentially along an axially inner end of a portion of the disk radially outer portion 14 located adjacent to a radially outer end portion of the spoke portion 13.

The disk radially outer portion 14 may alternatively be fixed to the rim 20 at a position W3 (shown in FIG. 1), where W3 is defined as a circumferential position extending circumferentially along an axially inner end of a portion of the disk radially outer portion 14 located adjacent to a disk portion between the vent window 15 and the radially outer end portion of the spoke portion 13.

The disk radially outer portion 14 may alternatively be fixed to the rim 20 at any two positions selected from the circumferential positions W1, W2 and W3 (at W1 and W2, or at W1 and W3, or at W2 and W3). The disk radially outer portion 14 may alternatively be fixed to the rim 20 at all of the circumferential positions W1, W2 and W3.

When the disk radially outer portion 14 is fixed to the rim 20 at the position W1, stress concentration on the weld may be reduced, and a fatigue durability of the wheel 1 may be increased, because the rigidity at the position W1 is less than that at the position W2.

When the disk radially outer portion 14 is fixed to the rim 20 at the position W2, a load from the rim 20 may be transmitted to the hub coupling portion 12 through the spoke portion 13.

When the disk radially outer portion 14 is fixed to the rim 20 at the position W3, an axial position of the position W3 after press-forming may be stable even if the vent window 15 is punched before the disk radially outer portion 14 is press-formed.

Figure 20:
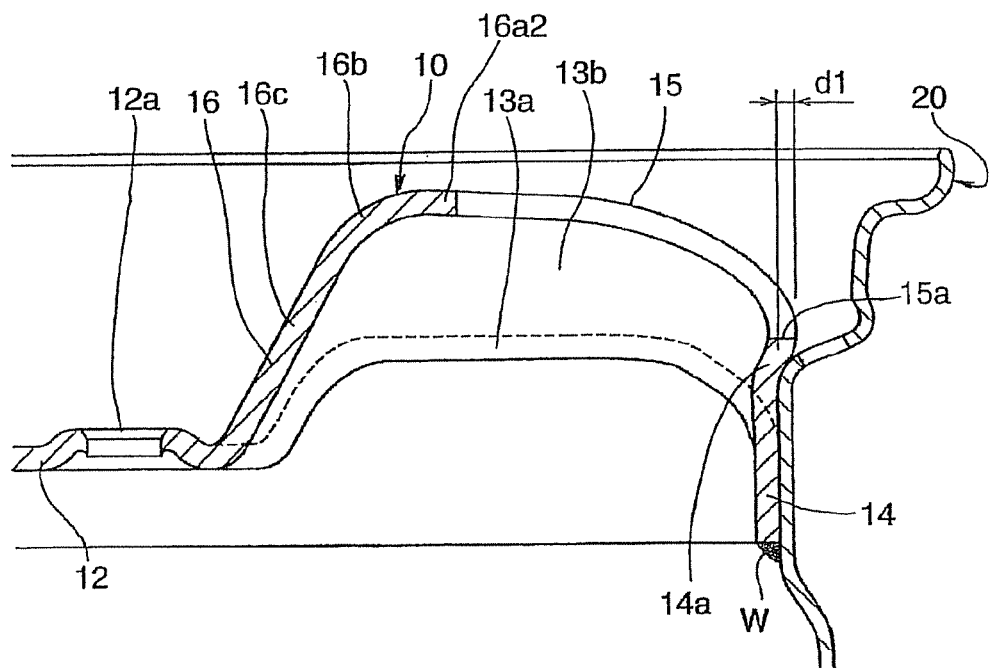
FIG. 20 is a cross-sectional view of a portion of a vehicle wheel disk according to an embodiment of the present invention.
Figure 21:
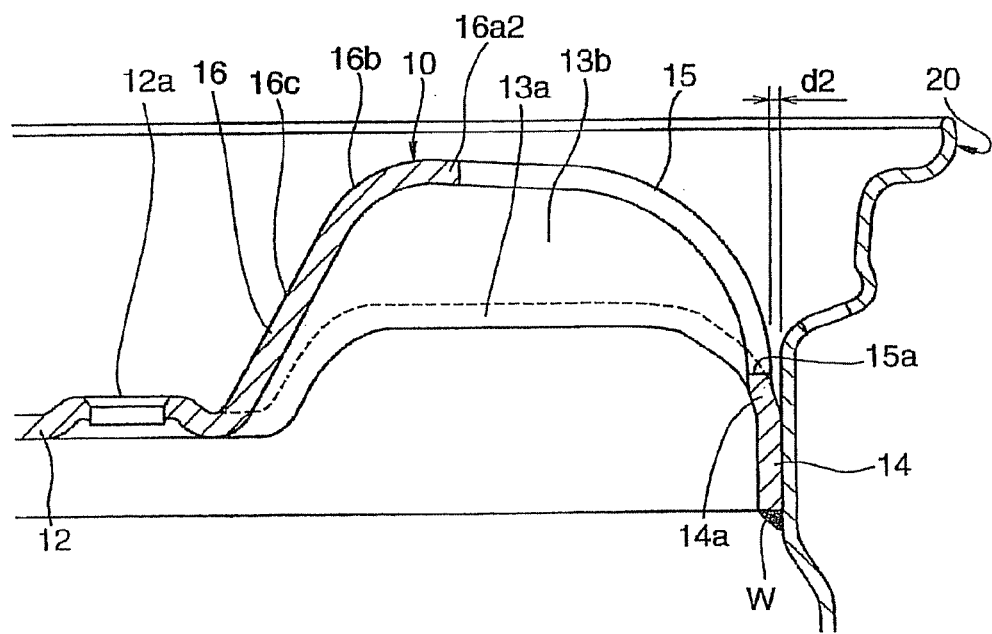
FIG. 21 is a cross-sectional view of a portion of a vehicle wheel disk according to an embodiment of the present invention.

When the disk radially outer portion 14 is fixed to the rim by welding, the weld W may be axially positioned at the axially inner end of the disk radially outer portion 14 (as shown in FIGS. 2, 20 and 21), or at the axially outer end of the disk radially outer portion 14 (not shown), or at both of the axially inner and outer ends of the disk radially outer portion 14.

As illustrated in FIG. 1, a vent window 15 may be located between adjacent spoke portions 13. The vent windows 15 may be spaced equally along the circumferential direction of the wheel. The same number of vent windows 15 as that of the spoke portions 13 are provided. A radially outer end portion 15a of the vent window 15 defines an axially innermost portion of the vent window 15. In FIGS. 2 and 26, the radially outer end portion 15a of the vent window 15 reaches the disk radially outer portion 14 and is directly connected to the disk radially outer portion 14. However, as illustrated in FIGS. 20 and 21, a tapered or stepped shift portion 14a may be provided between the vent window 15 and the disk radially outer portion 14.

In FIG. 20, the shift portion 14a is stepped. A diameter of a portion of the shift portion 14a closer to the vent window portion 15 may be larger than a diameter of a portion of the shift portion 14a closer to the disk radially outer portion 14. The radially outer end portion 15a of the vent window 15 is located radially outside a radially outer surface of the disk radially outer portion 14. In some embodiments of the invention, a difference in radius (the size of a step) d1 between the radially outer surface of the disk radially outer portion 14 and a radially outer surface of the shift portion 14a may be smaller than a thickness of the disk radially outer portion 14 (e.g. 5 mm, more usually, 2.5 mm-8 mm). In some embodiments of the invention, the step amount d1 may be 0.5 mm or larger and equal to or smaller than the thickness of the disk radially outer portion 14. When the step amount d1 is equal to 0.5 mm or larger and equal to or smaller than the thickness of the disk radially outer portion 14, a rigidity of the disk radially outer portion 14 is high and the durability of the wheel 1 is high.

In FIG. 21, the shift portion 14a is stepped. A diameter of a portion of the shift portion 14a closer to the vent window portion 15 may be smaller than a diameter of a portion of the shift portion 14a closer to the disk radially outer portion 14. The radially outer end portion 15a of the vent window 15 is located radially inside the radially outer surface of the disk radially outer portion 14. In some embodiments of the invention, a difference in radius (the size of a step) d2 between the radially outer surface of the disk radially outer portion 14 and a radially outer surface of the shift portion 14a may be smaller than a thickness of the disk radially outer portion 14 (e.g. 5 mm, more usually, 2.5 mm-8 mm). In some embodiments of the invention, the step amount d2 may be 0.5 mm or larger and equal to or smaller than the thickness of the disk radially outer portion 14.

As illustrated in FIG. 3, the connecting wall 16 may be located radially inside the disk radially outer portion 14 and may connect the pair of spoke side portions 13b located on circumferentially opposite sides of the vent window 15. The connecting wall 16 may include a vent window surrounding portion 16a, a vent window surrounding curved portion 16b, and a crest wall portion 16c of a radially inwardly protruding protrusion.

As illustrated in FIG. 28, the vent window surrounding portion 16a may include a side portion 16a1 located on each of opposite sides of the vent window 15 in the circumferential direction of the wheel, and a radially inner portion 16a2 located radially inside the vent window 15. The side portion 16a1 of the vent window surrounding portion 16a may be located between the vent window 15 and the spoke strengthening wall 13b2 in the circumferential direction of the wheel. A spoke strengthening wall-side end portion of the side portion 16a1 of the vent window surrounding portion 16a may be tangentially connected to the spoke strengthening wall 13b2 so that the side portion 16a1 of the vent window surrounding portion 16a and the spoke strengthening wall 13b2 are smoothly connected.

The radially inner portion 16a2 of the vent window surrounding portion 16a may be connected to a radially inner end of the side portion 16a1 of the vent window surrounding portion 16a at a radially outer end of the radially inner portion 16a2 of the vent window surrounding portion 16a.

The vent window surrounding curved portion 16b is a portion which may be tangentially connected to a radially inner end of the radially inner portion 16a2 of the vent window surrounding portion 16a and curved axially inwardly from the radially inner portion 16a2 of the vent window surrounding portion 16a.

As illustrated in FIG. 29, the crest wall portion 16c of the protrusion may be tangentially connected to the vent window surrounding curved portion 16b at a radially inner end of the vent window surrounding curved portion 16b. The crest wall portion 16c of the protrusion may extend radially and axially inwardly from the vent window surrounding curved portion 16b. The crest wall portion 16c of the protrusion may connect the vent window surrounding curved portion 16b and the hub coupling portion 12. The crest wall portion 16c of the protrusion may be disposed radially more inwardly than the bottom wall inclined portion 13a1 of the spoke bottom wall 13a. The crest wall portion 16c of the protrusion may extend from the vent window surrounding curved portion 16b to the hub coupling portion 12 in the radial direction of the wheel.

Figure 27:
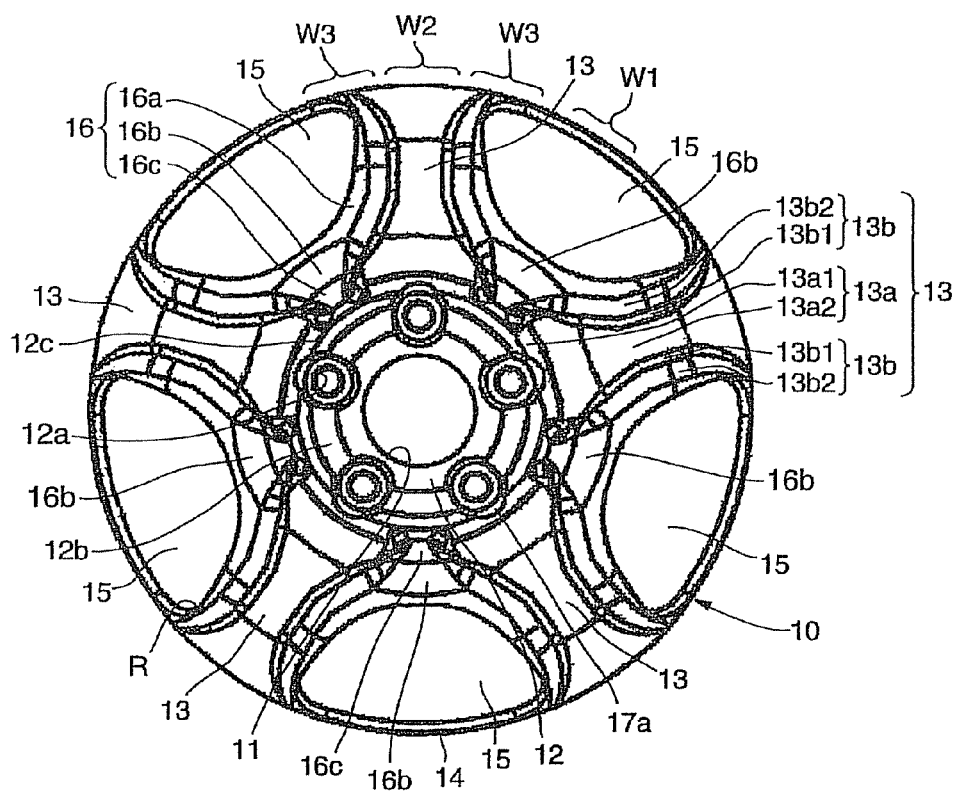
FIG. 27 is a front view of a vehicle wheel disk shoving its curved surface by skeleton lines according to an embodiment of the present invention.

The crest wall portion 16c of the protrusion may radially extend from the vent window surrounding curved portion 16b to a position radially inside a circle which connects radially outer ends of hub bolt holes 12a and has a circle center at a wheel center. As illustrated in FIGS. 1-3, the crest wall portion 16c of the protrusion may radially extend from the vent window surrounding curved portion 16b to the circle which connects radially outer ends of hub bolt holes 12a and has a circle center at a wheel center. As illustrated in FIG. 27, the crest wall portion 16c of the protrusion may radially extend from the vent window surrounding curved portion 16b to a radially outermost end of the hub coupling portion 12. As illustrated in FIG. 27, the crest wall portion 16c of the protrusion may extend radially more inwardly than the bottom wall inclined portion 13a1 of the spoke bottom wall 13a except a portion where the crest wall portion 16c of the protrusion and the hub coupling portion 12 connect to each other. The crest wall portion 16c of the protrusion may be smoothly connected to a surrounding portion of the crest wall portion 16c of the protrusion.

As illustrated in FIGS. 3, 28 and 29, the crest wall portion 16c of the protrusion may include a curved portion 16c1 curved axially outwardly from the hub coupling portion 12 and an inclined portion 16c2 connecting the curved portion 16c1 and the vent window surrounding curved portion 16b. The hub coupling portion 12 and the curved portion 16c1 of the crest wall portion may be smoothly connected to one another, the curved portion 16c1 of the crest wall portion and the inclined portion 16c2 of the crest wall portion may be smoothly connected to one another, and the inclined portion 16c2 of the crest wall portion and the vent window surrounding curved portion 16b may be smoothly connected to one another.

In a cross-sectional view taken along a radius of the wheel, the inclined portion 16c2 of the crest wall portion may extend straight or substantially straight, as illustrated in FIG. 29. The inclined portion 16c2 of the crest wall portion may be located radially inward relative to the spoke bottom wall radially inner inclined portion 13a1-2.

FIGS. 4-8 illustrate cross sections taken along a flat plane perpendicular to the wheel axis (i.e., along X-X of FIG. 2), of embodiments of the crest wall portion 16c of the protrusion according to the present invention.

The crest wall portion 16c of the protrusion may be smoothly connected to the pair of spoke strengthening walls 13b2 located at the opposite circumferential ends of the crest wall portion 16c as illustrated in FIGS. 4-8. A radial length of each of the pair of spoke strengthening walls 13b2 may decrease in a radially and axially inward direction of the wheel. The radial length of each of the pair of spoke strengthening walls 13b2 located at the opposite circumferential ends of the crest wall portion 16c may be zero at a radially and axially inward end of each of the walls 13b2.

Figure 4:
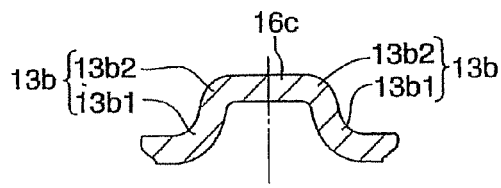
FIG. 4 is a cross-sectional view of a vehicle wheel disk taken along line X-X of FIG. 2, according to an embodiment of the invention.
Figure 5:
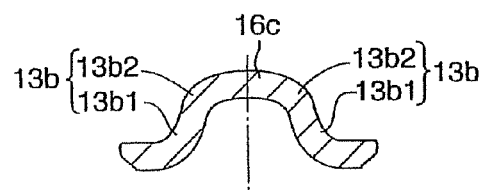
FIG. 5 is a cross-sectional view of a vehicle wheel disk taken along line X-X of FIG. 2, according to an embodiment of the invention.
Figure 6:
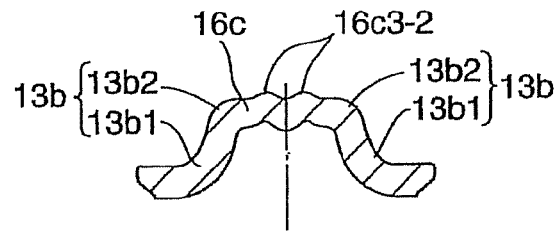
FIG. 6 is a cross-sectional view of a vehicle wheel disk taken along line X-X of FIG. 2, according to an embodiment of the invention.
Figure 7:
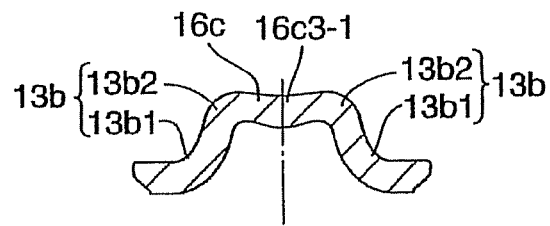
FIG. 7 is a cross-sectional view of a vehicle wheel disk taken along line X-X of FIG. 2, according to an embodiment of the invention.
Figure 8:
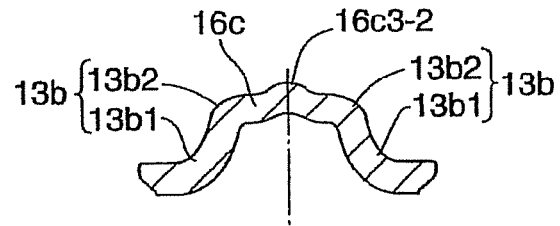
FIG. 8 is a cross-sectional view of a vehicle wheel disk taken along line X-X of FIG. 2, according to an embodiment of the invention.

The cross-sectional configuration of the crest wall portion 16c of the protrusion taken along the flat plane perpendicular to the wheel axis may be constructed from a straight line as illustrated in FIG. 4, or an arc or an ellipse having a radius of curvature larger than that of the spoke strengthening wall 13b2 located at the opposite ends of the crest wall portion 16c as illustrated in FIG. 5. As illustrated in FIGS. 6-8, at least one radial concave portion 16c3-1 or radial convex portion 16c3-2 may be provided at a circumferentially intermediate portion of the crest wall portion 16c of the protrusion.

In FIG. 5, the crest wall portion 16c of the protrusion is curved radially inwardly. However, the crest wall portion 16c of the protrusion may be curved radially outwardly. A circumferential length (a width) of the concave portion 16c3-1 or convex portion 16c3-2 may be constant or may vary in the radial direction of the wheel.

Figure 9:
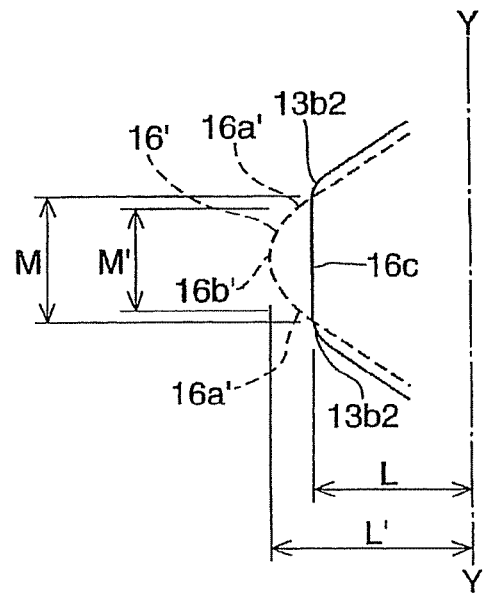
FIG. 9 is a schematic view comparing a crest wall portion of the protrusion and spoke side portions (shown by a full line) with a conventional protrusion (shown by a broken line), according to an embodiment of the invention.

FIG. 9 illustrates a configuration of a conventional crest wall portion 16' (which has a configuration of a convex arc having a single radius of curvature) by a dotted line and the configuration of the crest wall portion 16c and the spoke strengthening wall 13b2 connected to the crest wall portion 16c according to the present invention by a full line, so that the crest wall portion 16c and the spoke strengthening wall 13b2 can be compared with the conventional crest wall portion 16'.

In the conventional wheel, the pair of side walls 16a' are connected via the crest wall portion 16b' of the convex arc having a single radius of curvature. In contrast, in the present invention, the pair of spoke strengthening walls 13b2 may be connected via the crest wall portion 16c with the configuration of a straight line or an arc or ellipse having a radius of curvature larger than that of the spoke strengthening wall 13b2 located at the opposite ends of the crest wall portion 16c. Therefore, a distance L between the crest wall portion 16c and a neutral axis Y-Y of bending deformation of the spoke portion 13 may become smaller than a distance L' between the crest wall portion 16c' and the neutral axis Y-Y. Further, a circumferential length (or a width) M of the crest wall 16c may become larger than a circumferential length (or a width) M' of the crest wall 16c' so that a cross-sectional area of the crest wall portion 16c becomes large. This provides rigidity to the spoke portion 13. Further, by making a space between the pair of spoke strengthening walls 13b2 larger than a space between the pair of side wall 16a', the cross-sectional area of the crest wall portion 16c may be made larger. This also provides rigidity to the spoke portion 13.

Figure 10:
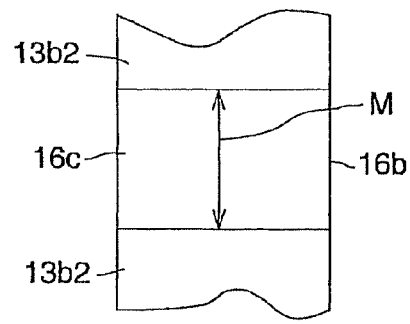
FIG. 10 is a schematic view of a portion of a vehicle wheel disk according to an embodiment of the present invention viewed in the direction of arrow B of FIG. 2.
Figure 11:
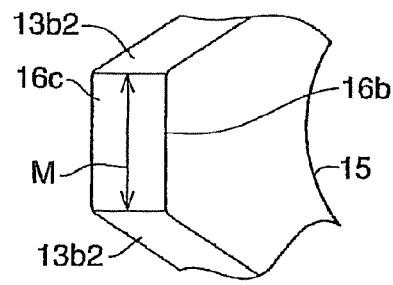
FIG. 11 is a schematic view of a portion of a vehicle wheel disk according to an embodiment of the present invention viewed in the direction of arrow A of FIG. 2.
Figure 12:
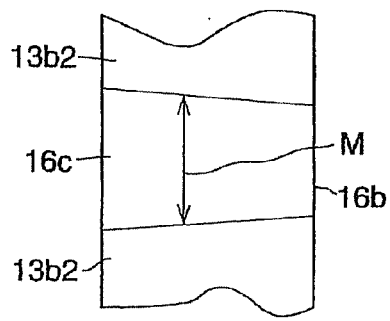
FIG. 12 is a schematic view of a portion of a vehicle wheel disk according to an embodiment of the present invention viewed in the direction of arrow B of FIG. 2.
Figure 13:
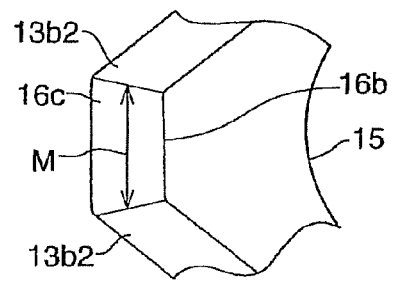
FIG. 13 is a schematic view of a portion of a vehicle wheel disk according to an embodiment of the present invention viewed in the direction of arrow A of FIG. 2.
Figure 14:
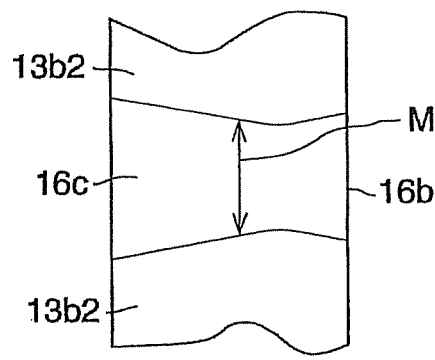
FIG. 14 is a schematic view of a portion of a vehicle wheel disk according to an embodiment of the present invention viewed in arrow B of FIG. 2.
Figure 15:
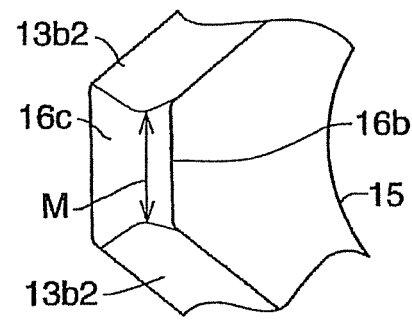
FIG. 15 is a schematic view of a portion of a vehicle wheel disk according to an embodiment of the present invention viewed in the direction of arrow A of FIG. 2.
Figure 16:
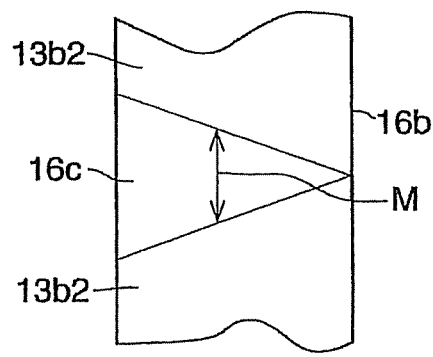
FIG. 16 is a schematic view of a portion of a vehicle wheel disk according to an embodiment of the present invention viewed in the direction of arrow B of FIG. 2.
Figure 17:
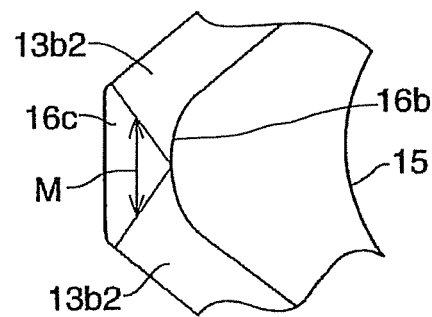
FIG. 17 is a schematic view of a portion of a vehicle wheel disk according to an embodiment of the present invention viewed in the direction of arrow A of FIG. 2.
Figure 18:
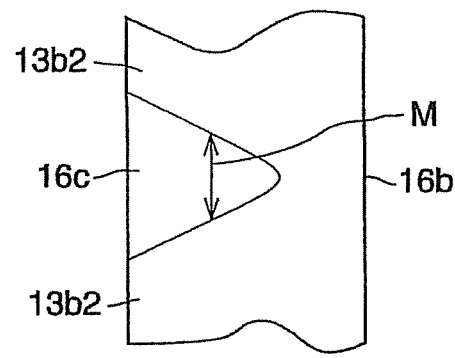
FIG. 18 is a schematic view of a portion of a vehicle wheel disk according to an embodiment of the present invention viewed in the direction of arrow B of FIG. 2.
Figure 19:
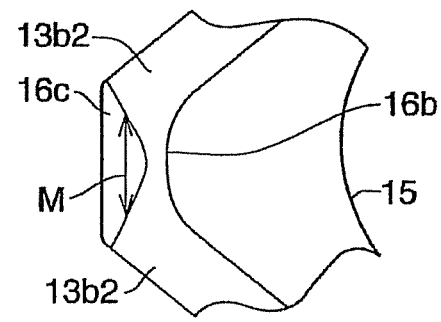
FIG. 19 is a schematic view of a portion of a vehicle wheel disk according to an embodiment of the present invention viewed the direction of in arrow A of FIG. 2.

The crest wall portion 16c may have at least any of the following (i)-(v) structures: (i) as illustrated in FIG. 28, the circumferential length (width) M of the crest wall portion 16c may be larger at a radially or axially inner end than at a radially or axially intermediate portion, and may be larger at a radially or axially outer end than at the radially or axially inner end;
(ii) as illustrated in FIGS. 10 and 11, the circumferential length (width) M of the crest wall portion 16c may be constant in the radial or axial direction of the wheel;
(iii) as illustrated in FIGS. 12 and 13, the circumferential length (width) M of the crest wall portion 16c may gradually increase in a direction from the radially or axially outer end to the radially or axially inner end of the wheel;
(iv) as illustrated in FIGS. 14 and 15, the circumferential length (width) M of the crest wall portion 16c may be larger at the radially or axially outer end than at the radially or axially intermediate portion, and may be larger at the radially or axially inner end than at the radially or axially outer end; or
(v) as illustrated in FIGS. 16-19, the circumferential length (width) M of the crest wall portion 16c may gradually decrease in a direction from the radially or axially inner end toward the radially or axially outer end of the wheel, and may become zero at the radially or axially intermediate portion of the wheel or at a connecting portion of the vent window surrounding curved portion 16b.

As explained above, FIGS. 10, 12, 14, 16 and 18 illustrate the crest wall portion 16c viewed from a point radially inside the wheel (in direction B of FIG. 2), and FIGS. 11, 13, 15, 17 and 19 illustrate the crest wall portion 16c viewed from a point axially outside the wheel (indirection A of FIG. 2).

While various embodiments have been described above, it should be understood that they have been presented as examples and not limitations. It will be clear to those skilled in the relevant art(s) that various changes in form and detail can be made without departing from the spirit and scope. After reading the above description, it will be apparent to one skilled in the relevant art(s) how to implement alternate embodiments. Therefore, the present embodiments should not be limited by the above-described embodiments.

It should also be understood that any figures highlighting the functionality and advantages are presented as examples only. The disclosed methodology and system are each sufficiently flexible and configurable such that they may be utilized in ways other than those shown.

It should be noted that the terms "a", "and", "the", "said", etc. signify "at least one" or "the at least one" in the claims, specification, and drawings.

Finally, it is the applicant's intent that only claims including the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A vehicle wheel disk comprising:
a hub coupling portion surrounding a hub hole;
a plurality of spoke portions each extending outwardly in a radial direction of a wheel from the hub coupling portion and having a spoke bottom wall and a spoke side portion;
a vent window located between adjacent spoke portions of the plurality of spoke portions;
a disk radially outer portion located at a radially outer end portion of the wheel and connecting radially outer end portions of the plurality of spoke portions in a circumferential direction of the wheel; and
a connecting wall located radially inside the disk radially outer portion and connecting a pair of spoke side portions located on opposite sides of the vent window in the circumferential direction of the wheel;
wherein the spoke bottom wall includes a bottom wall inclined portion extending outwardly in an axial direction of the wheel from the hub coupling portion, and a bottom wall main portion extending outwardly in the radial direction of the wheel from the bottom wall inclined portion,
wherein the spoke side portion includes a spoke side wall extending in the axial direction of the wheel from each of opposite circumferential ends of the spoke bottom wall and a spoke strengthening wall extending in the circumferential direction of the wheel from an axial end of the spoke side wall,
wherein the connecting wall includes a vent window surrounding portion, a vent window surrounding curved portion, and a crest wall portion of a radially inwardly protruding protrusion,
wherein the vent window surrounding portion includes a side portion located on each of opposite sides of the vent window in the circumferential direction of the wheel, and a radially inner portion located radially inside the vent window,
wherein the vent window surrounding curved portion is a portion which is connected to a radially inner end of the radially inner portion of the vent window surrounding portion and is curved axially inboard from the radially inner portion of the vent window surrounding portion,
wherein the crest wall portion of the protrusion is tangentially connected to and at a radially inner end of the vent window surrounding curved portion, connects the vent window surrounding curved portion and the hub coupling portion and protrudes radially more inwardly than the bottom wall inclined portion of the spoke bottom wall, wherein the crest wall portion of the protrusion includes a curved portion curved axially outwardly from the hub coupling portion and an inclined portion connecting the curved portion and the vent window surrounding curved portion, the inclined portion of the crest wall portion extending straight in a cross-sectional view taken along a radius of the wheel, wherein a configuration of a cross section of the crest wall portion of the protrusion taken along a plane perpendicular to a wheel axis is constructed of a straight line, or an arc or ellipse having a radius of curvature greater than a radius of curvature of the spoke strengthening wall located on each of opposite sides of the crest wall portion of the protrusion, and wherein the disk has a shift portion which is located between the vent window and the disk radially outer portion and which is radially inwardly and axially outwardly tapered or stepped in a direction from the disk radially outer portion toward the vent window, and wherein a radially outer end portion of the vent window is located radially inside the radially outer surface of the disk radially outer portion.

2. A vehicle wheel disk according to claim 1, wherein a circumferential width of a radially inner end portion of the crest wall portion of the protrusion of the connecting wall is greater than a circumferential width of a radially intermediate portion of the crest wall portion of the protrusion of the connecting wall.

3. A vehicle wheel disk according to claim 1, wherein a maximum of an axial height of the spoke side portion is in a range of two to twenty times of a thickness of the spoke bottom wall.

4. A vehicle wheel disk according to claim 2, wherein a maximum of an axial height of the spoke side portion is in a range of two to twenty times of a thickness of the spoke bottom wall.

5. A vehicle wheel disk according to claim 1, wherein a plurality of hub bolt holes are provided at a radially intermediate portion of the hub coupling portion, and wherein the crest wall portion of the protrusion radially extends from the vent window surrounding curved portion to a disk portion located radially equal to or radially outer than a circle which connects radially outer ends of the hub bolt holes and has a circle center at a wheel center.

* * * * *